United States Patent
Ogasawara et al.

(10) Patent No.: US 11,468,691 B2
(45) Date of Patent: Oct. 11, 2022

(54) TRAVELING LANE RECOGNITION APPARATUS AND TRAVELING LANE RECOGNITION METHOD

(71) Applicant: SUZUKI MOTOR CORPORATION, Hamamatsu (JP)

(72) Inventors: Shigeru Ogasawara, Hamamatsu (JP); Akinori Uno, Hamamatsu (JP); Yuuichi Umezane, Hamamatsu (JP); Hiroyuki Miyayama, Hamamatsu (JP)

(73) Assignee: SUZUKI MOTOR CORPORATION, Hamamatsu (JP)

( * ) Notice: Subject to any disclaimer, the term of this patent is extended or adjusted under 35 U.S.C. 154(b) by 258 days.

(21) Appl. No.: 16/865,298

(22) Filed: May 1, 2020

(65) Prior Publication Data
US 2020/0364470 A1 Nov. 19, 2020

(30) Foreign Application Priority Data
May 13, 2019 (JP) .............................. JP2019-090561

(51) Int. Cl.
*B60W 30/12* (2020.01)
*G06V 20/56* (2022.01)

(52) U.S. Cl.
CPC ........... *G06V 20/588* (2022.01); *B60W 30/12* (2013.01)

(58) Field of Classification Search
CPC ... G06V 20/588; G06V 10/147; B60W 30/12; H04N 5/23232
See application file for complete search history.

(56) References Cited

U.S. PATENT DOCUMENTS

| | | | |
|---|---|---|---|
| 2009/0174577 A1* | 7/2009 | Nakamura | G06V 20/588 382/104 |
| 2013/0028473 A1 | 1/2013 | Hilldore et al. | 382/103 |
| 2016/0180180 A1 | 6/2016 | Gupta et al. | |
| 2018/0181821 A1* | 6/2018 | Shimizu | G06V 10/44 |
| 2018/0201318 A1* | 7/2018 | Kataoka | B62D 6/08 |
| 2019/0035110 A1* | 1/2019 | Shikimachi | G06V 20/588 |

(Continued)

FOREIGN PATENT DOCUMENTS

JP  H 10-320559 A  12/1998

OTHER PUBLICATIONS

French Office Action dated Feb. 1, 2021, issued by the National Industrial Property Institute in corresponding application FR2004488.

*Primary Examiner* — Abby Y Lin
*Assistant Examiner* — Danielle Marie Jackson
(74) *Attorney, Agent, or Firm* — Stein IP, LLC

(57) ABSTRACT

A traveling lane recognition apparatus includes a camera and a controller. The controller recognizes a linear marking position where a linear marking exists in each of detection target images, repeatedly performs image detection processing for detecting a white line or a blank at a linear marking position in each of detection target images corresponding to captured images, in an order of capturing time points of the captured images. The controller is configured to recognize a lane in which the vehicle is traveling among the plurality of lanes on the street based on a positional relationship between a solid lane line detected by the lane line detection and the vehicle and a positional relationship between the broken lane line detected by the lane line detection and the vehicle.

10 Claims, 7 Drawing Sheets

(56) References Cited

U.S. PATENT DOCUMENTS

| | | | |
|---|---|---|---|
| 2019/0035280 A1* | 1/2019 | Kim | G08G 1/167 |
| 2019/0130182 A1* | 5/2019 | Zang | G06V 20/182 |
| 2019/0370566 A1* | 12/2019 | Su | B60W 30/12 |

* cited by examiner

TRAVELING LANE RECOGNITION APPARATUS AND TRAVELING LANE RECOGNITION METHOD

CROSS-REFERENCE TO RELATED APPLICATIONS

The disclosure of Japanese Patent Application No. 2019-090561 filed on May 13, 2019, including specification, drawings and claims is incorporated herein by reference in its entirety.

BACKGROUND

The present invention relates to a traveling lane recognition apparatus, a traveling lane recognition method, and a program for recognizing a lane in which a vehicle is traveling among a plurality of lanes on a street.

In order to control driving of an automatic driving vehicle in response to an increase or decrease of lanes, branching or merging of lanes at interchanges or junctions on a street during traveling, it is necessary to recognize a lane in which the vehicle is traveling among a plurality of lanes on a street.

As a vehicle traveling lane recognition technique, there is known a technique for recognizing a lane in which a vehicle is traveling by estimating a position of the vehicle with a high-precision Global Positioning System (GPS) mounted on the vehicle and superimposing the position of the vehicle on a high-precision map. Further, there is known a technique for recognizing a lane in which a vehicle is traveling using a Light Detection and Ranging (LIDAR) device or laser radar mounted on the vehicle.

Meanwhile, although not describing a vehicle traveling lane recognition technique, but the following Patent Literature 1 describes a vehicle traveling road detection device that recognizes a shape of a road area by performing image processing on an image obtained by capturing a road with an in-vehicle camera.

Patent Literature 1: JP-A-10-320559

SUMMARY

According to an advantages aspect of the invention, there is provided a traveling lane recognition apparatus including:
a camera configured to continuously capture a front area, a rear area, or left and right areas of a vehicle traveling on a street; and
a controller, wherein
the contoller is configured to perform:
a lane line detection to detect a lane line on the street using a plurality of continuously captured images obtained by imaging continuous capturing of the camera; and
a traveling lane recognition to recognize a lane in which the vehicle is traveling among a plurality of lanes on the street based on the lane line detected by the lane line detection,
wherein, in the lane line detection, the processor is configured:
to extract an image in a predetermined range from each of the plurality of captured images as a detection target image;
to recognize a linear marking position where a linear marking exists in each of the detection target images;
to repeatedly perform image detection processing for detecting a white line or a blank at the linear marking position in each of the plurality of detection target images corresponding to the plurality of captured images, in an order of capturing time points of the plurality of captured images;
as a result of the image detection processing, to determine that the linear marking existing at the linear marking position is a solid lane line when a white line is detected at the linear marking position continuously for a first reference number of times or more in the plurality of detection target images, the first reference number of times is a natural number of 2 or more; and
as a result of the image detection processing, to determine that the linear marking existing at the linear marking position is a broken lane line when, at the linear marking position in the plurality of detection target images, continuous detection of a white line with a second reference number of times or more and less than the first reference number of times and continuous detection of a blank with a third reference number of times or more is repeated alternately a plurality of times, the second reference number of times and the third reference number of times are a natural number respectively, and
wherein, in the traveling lane recognition, the controller is configured to recognize the lane in which the vehicle is traveling among the plurality of lanes on the street based on a positional relationship between the solid lane line detected by the lane line detection and the vehicle and a positional relationship between the broken lane line detected by the lane line detection and the vehicle.

According to another advantages aspect of the invention, there is provided a traveling lane recognition method including:
a lane line detection of detecting a lane line of a street using a plurality of continuously captured images obtained by a camera continuously capturing a front area, a rear area, or left and right areas of a vehicle traveling on the street, and
a traveling lane recognition of recognizing a lane in which the vehicle is traveling among a plurality of lanes on the street based on the lane line detected in the lane line detection, wherein
in the lane line detection,
an image in a predetermined range is extracted from each of the plurality of captured images as a detection target image,
a linear marking position where a linear marking exists is recognized in each of the detection target images,
image detection processing for detecting a white line or a blank at the linear marking position in each of the plurality of detection target images corresponding to the plurality of captured images is repeatedly performed in the order of capturing time points of the plurality of captured images,
as a result of the image detection processing, it is determined that the linear marking existing at the linear marking position is a solid lane line when a white line is detected at the linear marking position continuously for a first reference number of times or more in the plurality of detection target images, the first reference number of times is a natural number of 2 or more, and
as a result of the image detection processing, it is determined that the linear marking existing at the linear marking position is a broken lane line when, at the linear marking position in the plurality of detection target images, continuous detection of a white line with a second reference number of times or more and less than the first reference number of times k and continuous detection of a blank with a third reference number of times or more is repeated alternately a plurality of times, the first reference number of times is a natural number of 2 or more, in the traveling lane recognition, the lane in which the vehicle is traveling among the plurality of lanes on the street is recognized based on a positional relationship between the solid lane line detected in the lane line detection step and the vehicle and a positional relationship between the broken lane line detected in the lane line detection and the vehicle.

According to another advantages aspect of the invention, there is provided a non-transitory computer readable medium storing a program causing a computer to execute the traveling lane recognition method.

DETAILED DESCRIPTION OF EXEMPLIFIED EMBODIMENTS

Figure 1:
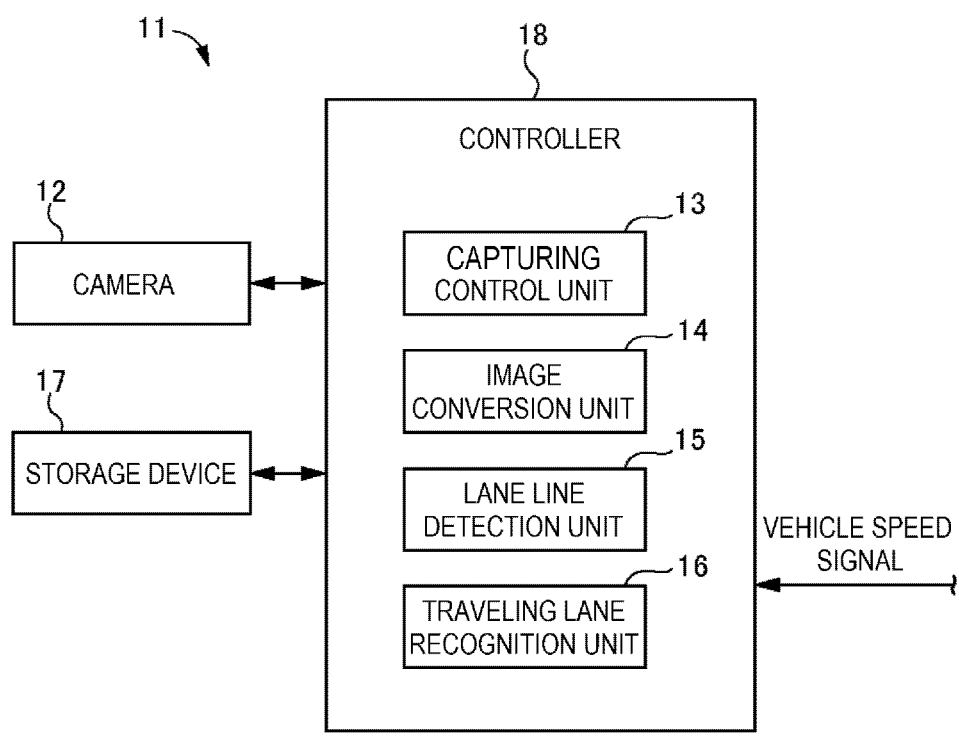
FIG. 1 is a block diagram showing a configuration of a traveling lane recognition apparatus according to an embodiment of the present invention.

A high-precision GPS, a LIDAR device, or laser radar is used for the vehicle traveling lane recognition technique described above. However, the high-precision GPS, LIDAR device, and laser radar are all expensive. It is desired to recognize the vehicle traveling lane with cheaper means.

It is considered to capture an image of the street by a camera mounted on the vehicle, detect a position, a type or the like of lane lines included in the obtained image, and recognize a lane in which the vehicle is traveling based on the detection result. However, in this case, it is not easy to detect the position, the type or the like of the lane lines included in the image with high accuracy. For example, on old streets that are poorly maintained, a part of the lane lines may be lost, which may cause a false detection of the position, the type or the like of the lane lines. Further, there is a possibility that the lane lines and road markings other than the lane lines displayed on the street cannot be accurately identified.

In Patent Literature 1, it is suggested to determine a lane position on the street by the camera. However, the determination is merely performed as one aspect of shape recognition of a road area. Recognizing the lane in which the vehicle is traveling is not described or suggested in Patent Literature 1.

The present invention has been made in view of the above-described problems, and an object of the present invention is to provide a traveling lane recognition apparatus, a traveling lane recognition method, and a program capable of recognizing a lane in which a vehicle is traveling with high accuracy based on a street image captured by a camera.

A traveling lane recognition apparatus according to an embodiment of the present invention includes a camera, a lane line detection unit, and a traveling lane recognition unit.

The camera continuously images a front area, a rear area, or left and right areas of a vehicle traveling on a street. A plurality of continuously captured images that change with the movement of the traveling vehicle can be obtained by continuous capturing of the camera. For example, 72 to 300 continuously captured images that change with the movement of the traveling vehicle are obtained when the camera is used for capturing images for 3 to 5 seconds at a frame rate of 24 to 60 fps (frame per second). In each of the captured images obtained by the camera capturing images, for example, a lane in which the vehicle is traveling, a lane on a right side of the lane in which the vehicle is traveling, a lane on a left side of the lane in which the vehicle is traveling, a lane line between the lane in which the vehicle is traveling and the lane on the right side thereof, and a lane line between the lane in which the vehicle is traveling and the lane on the left side thereof, or the like are preferably included. In order to obtain such a captured image, it is preferable to use a camera with a wide angle of view.

The lane line detection unit detects a lane line on the street using the plurality of continuously captured images obtained by continuous capturing of the camera. Specifically, the lane line detection unit (1) extracts an image in a predetermined range from each of the captured images as a detection target image, and (2) recognizes a linear marking position where a linear marking exists in each of the detection target images. Subsequently, the lane line detection unit (3) repeatedly performs image detection processing for detecting a white line or a blank at the linear marking position in each of the plurality of detection target images corresponding to the plurality of captured images in the order of capturing time points of the plurality of captured images. (4-1) as a result of the image detection processing, the lane line detection unit determines that the linear marking existing at the linear marking position is a solid lane line when a white line is detected at the linear marking position continuously for a first reference number of times k (k is a natural number of 2 or more) or more in the plurality of detection target images. Meanwhile, (4-2) as a result of the image detection processing, the lane line detection unit determines that the linear marking existing at the linear marking position is a broken lane line when, at the linear marking position in the plurality of detection target images, continuous detection of a white line with a second reference number of times m (m is a natural number) or more and less than the first reference number of times k and continuous detection of a blank with a third reference number of times n (n is a natural number) or more is repeated alternately a plurality of times. Here, the "blank" means a portion where nothing is displayed on a road surface, that is, a portion where a bare road surface appears.

For example, it is assumed that a frame rate of the camera is 30 fps, a travelling speed of the vehicle is 100 km/h, a length in a front-rear direction of the detection target image is 5 m, a length in the front-rear direction of a white line portion of a lane boundary line displayed on the street is 8 m, and a length in the front-rear direction of a blank portion of the lane boundary line displayed on the street is 12 m. Under this condition, when it is assumed that an ideal lane boundary line is captured by the camera while the vehicle is traveling, since a difference between the length in the front-rear direction of the white line portion of the lane boundary line and the length in the front-rear direction of the detection target image is 3 m, a time required for the vehicle to move 3 meters at the speed of 100 km/h is 0.108 seconds and the frame rate of the camera is 30 fps, the number of times that the detection target image in which the blank portion in the ideal lane boundary line is not included is continuously obtained is 3. Under the above condition, when it is assumed that an ideal lane boundary line is captured by the camera while the vehicle is traveling, since a difference between the length in the front-rear direction of the blank portion of the lane boundary line and the length in the front-rear direction of the detection target image is 7 m, a time required for the vehicle to travel 7 meters at the speed of 100 km/h is 0.252 seconds, and the frame rate of the camera is 30 fps, the number of times that the detection target image in which the white line portion in the ideal lane boundary line is not included is continuously obtained is 7.

In this case, it can be determined whether the linear marking existing at the linear marking position is a solid lane line, a broken lane line, or neither a solid lane line nor a broken lane line by setting the first reference number of times k, the second reference number of times m, and the third reference number of times n to satisfy any of the following (A), (B), and (C).

(A) The first reference number of times k is set to a number of times greater than 3, the second reference number of times m is set to 3, and the third reference number of times n is set to 7.

(B) The first reference number of times k is set to a number of times greater than 3, the second reference number of times m is set to 3, and the third reference number of times n is set to any number of times of 1 or more.

(C) The first reference number of times k is set to a number of times greater than 3, the second reference number of times m is set to any number of times of 1 or more and less than the first reference number of times k, and the third reference number of times n is set to 7. The ideal lane boundary line means a complete lane boundary line in which there is no disappearance in the white line portion of the lane boundary line, and no blank portion of the lane boundary line is erroneously detected as a white line.

By setting the first reference number of times k to a number of times greater than 3 in all of the above (A), (B), and (C), it can be determined whether a white line longer than 8 m exists at the linear marking position when the vehicle is traveling at a speed of 100 km/h. When a white line longer than 8 m exists at the linear marking position, it can be clearly estimated that the linear marking existing at the linear marking position is a solid lane line, that is, a street outer line or a street center line.

By setting the second reference number of times m to 3 and the third reference number of times n to 7 in the above (A), it can be determined whether a white line of 8 m and a blank of 12 m exist alternately at the linear marking position when the vehicle is traveling at a speed of 100 km/h. When the white line of 8 m and the blank of 12 m exist alternately at the linear marking position, it can be clearly estimated that the linear marking existing at the linear marking position is a broken lane line, that is, a lane boundary line.

By setting the second reference number of times m to 3 and the third reference number of times n to any number of times of 1 or more in the above (B), it can be determined whether a white line of 8 m and a blank whose length is not specified exist alternately at the linear marking position when the vehicle is traveling at a speed of 100 km/h. When the white line of 8 m and the blank whose length is not specified exist alternately at the linear marking position, it can be clearly estimated that the linear marking existing at the linear marking position is a broken lane line, that is, a lane boundary line.

By setting the second reference number of times m to any number of times of 1 or more and the third reference number of times n to 7 in the above (C), it can be determined whether a white line whose length is not specified and a blank of 12 m exist alternately at the linear marking position when the vehicle is traveling at a speed of 100 km/h. When the white line whose length is not specified and the blank of 12 m exist alternately at the linear marking position, it can be clearly estimated that the linear marking existing at the linear marking position is a broken lane line, that is, a lane boundary line.

According to the lane line detection unit of the traveling lane recognition apparatus of the present embodiment, it can be determined whether the linear marking existing at the linear marking position has, for example, a structural feature of a lane boundary line in which a white line of 8 m and a blank of 12 m exist alternately, a structural feature of a lane boundary line in which a white line of 8 m and a blank whose length is not specified exist alternately, or a structural feature of a lane boundary line in which a white line whose length is not specified and a blank of 12 m exist alternately, and whether the marking on the street is a lane boundary line can be recognized based on the determination. Therefore, it is possible to prevent the marking on the street from being erroneously recognized as a lane boundary line even though the marking is not a lane boundary line. Specifically, even in a case where a part of the street outer line or the street center line disappears and has a broken line shape, it is possible to prevent such a street outer line or street center line from being erroneously detected as a lane boundary line. Further, it is possible to prevent road markings other than lane lines from being erroneously detected as lane boundary lines.

The traveling lane recognition unit recognizes a lane in which the vehicle is traveling among the plurality of lanes on the street based on the lane line detected by the lane line detection unit. Specifically, the traveling lane recognition unit recognizes the lane in which the vehicle is traveling among the plurality of lanes on the street based on a positional relationship between a solid lane line and the vehicle and a positional relationship between a broken lane line and the vehicle.

For example, when a t-th (t is a natural number) lane line from the vehicle toward the left of the vehicle is a solid lane line, it can be recognized that the lane in which the vehicle is traveling among the plurality of lanes of the street is a t-th lane from a left end on one side of the street. In addition, a t-th (t is a natural number) lane line from the vehicle toward the right of the vehicle is a solid lane line, it can be recognized that the lane in which the vehicle is traveling among the plurality of lanes of the street is a t-th lane from a right end on one side of the street.

According to the traveling lane recognition apparatus of the present embodiment, the lane in which the vehicle is traveling can be recognized with high accuracy based on the highly accurate lane boundary line detection result of the lane line detection unit.

A traveling lane recognition method of an embodiment of the present invention includes a lane line detection step of detecting a lane line of a street using a plurality of continuously captured images obtained by a camera continuously capturing a front area, a rear area, or left and right areas of a vehicle traveling on the street; and a traveling lane recognition step of recognizing a lane in which the vehicle is traveling among the plurality of lanes on the street based on the lane line detected by the lane line detection unit. Further, in the lane line detection step, (1) an image in a predetermined range is extracted from each of the captured images as a detection target image; (2) a linear marking position where a linear marking exists is recognized in each of the detection target images; (3) image detection processing for detecting a white line or a blank at the linear marking position in each of the plurality of detection target images corresponding to the plurality of captured images is repeatedly performed in the order of capturing time points of the plurality of captured images; (4-1) as a result of the image detection processing, it is determined that the linear marking existing at the linear marking position is a solid lane line when a white line is detected at the linear marking position continuously for a first reference number of times k (k is a natural number of 2 or more) or more in the plurality of detection target images; and (4-2) as a result of the image detection processing, it is determined that the linear marking existing at the linear marking position is a broken lane line when, at the linear marking position in the plurality of detection target images, continuous detection of a white line with a second reference number of times m (m is a natural number) or more and less than the first reference number of times k and continuous detection of a blank with a third reference number of times n (n is a natural number) or more is repeated alternately a plurality of times. In the traveling lane recognition step, the lane in which the vehicle is traveling among the plurality of lanes on the street is recognized based on a positional relationship between a solid lane line detected in the lane line detection step and the vehicle and a positional relationship between a broken lane line detected in the lane line detection step and the vehicle.

According to the traveling lane recognition method of the embodiment of the present invention, it can be recognized whether the marking on the street is the lane boundary line based on whether the linear marking existing at the linear marking position has the structural feature of the lane boundary line. Therefore, it is possible to prevent the marking on the street from being erroneously recognized as a lane boundary line even though the marking is not a lane boundary line. In the traveling lane recognition step, the lane in which the vehicle is traveling can be recognized with high accuracy based on the highly accurate lane boundary line detection result in the lane line detection step.

The same effect as the traveling lane recognition method of the embodiment of the present invention can also be obtained by a program for causing a computer to execute the traveling lane recognition method of the embodiment of the present invention.

EMBODIMENTS

Embodiments of a traveling lane recognition apparatus and a traveling lane recognition method of the present invention will be described with reference to the drawings. Arrows indicating the front (F), rear (B), left (L), and right (R) directions are drawn in respective left-lower portions of FIGS. 2 and 9. Directions related to embodiments are described based on these arrows.

(Traveling Lane Recognition Apparatus)

Figure 2:
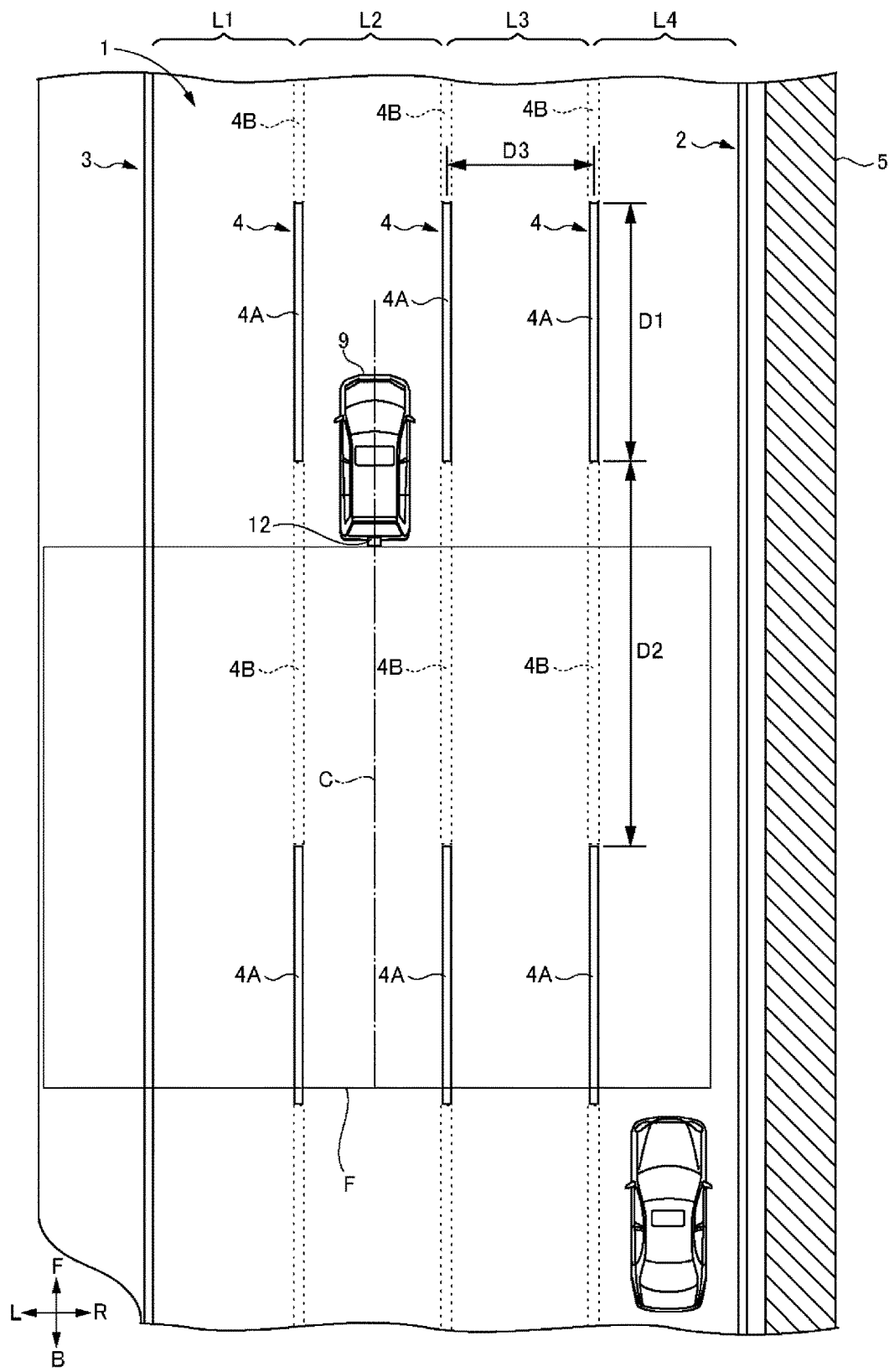
FIG. 2 is an explanatory diagram showing a state where a vehicle is traveling on a street with four lanes on each side.

FIG. 1 shows a configuration of a traveling lane recognition apparatus 11 according to an embodiment of the present invention. FIG. 2 shows a state in which a vehicle 9 is traveling in a street 1. The traveling lane recognition apparatus 11 shown in FIG. 1 has a function of detecting lane lines of the street 1 using images obtained by a camera 12 capturing images, and recognizing a lane in which the vehicle 9 is traveling based on the detected lane lines. The traveling lane recognition apparatus 11 is mounted on the vehicle 9 shown in FIG. 2. The vehicle 9 is, for example, a four-wheeled automatic driving vehicle. The vehicle 9 is traveling on the street 1 having four lanes on one side, for example.

In general, on a road surface of the street, lane lines such as a street center line, a street outer line, and a lane boundary line are marked. For example, as shown in FIG. 2, when the street 1 is a street with four lanes, that is, lanes L1 to L4, on one side, a street center line 2 is marked at a center portion in a width direction of the street 1 (a right end portion in FIG. 2), a street outer line 3 is marked on a left end portion of the street 1, and a lane boundary line 4 is marked between two adjacent lanes. The numeral 5 in FIG. 2 indicates a central strip.

The street center line 2 and the street outer line 3 each are configured by solid white lines. Meanwhile, the lane boundary line 4 is configured by a white broken line. Specifically, the lane boundary line 4 is configured such that white line portions 4A and blank portions 4B are alternately arranged in a front-rear direction. Here, the "blank" means a portion where nothing is displayed on the road surface, that is, a portion where a bare road surface appears. The "blank portion" of the lane boundary line 4 means a part that is blank in the lane boundary line 4. In FIGS. 2, 4, 5, and 6, the outer shape of the blank portion 4B of the lane boundary line 4 is indicated by a dotted line for convenience of explanation.

In the lane boundary line 4, a length D1 in the front-rear direction of each white line portion 4A and a length D2 in the front-rear direction of each blank portion 4B are constant. For example, when the street 1 is an expressway, in the lane boundary line 4, a standard value of the length D1 of each white line portion 4A is 8 m, and a standard value of the length D2 of each blank portion 4B is 12 m. In the street 1, a width D3 of each of the plurality of lanes, that is, an interval between two lane lines adjacent to each other is constant, for example, 3.5 m.

As shown in FIG. 1, the traveling lane recognition apparatus 11 includes the camera 12, an capturing control unit 13, an image conversion unit 14, a lane line detection unit 15, a traveling lane recognition unit 16, and a storage device 17.

The camera 12 is a monocular digital camera, for example. The camera 12 has a moving picture or video capturing function, and has a capability of continuously capturing images at a frame rate of, for example, 30 fps. The camera 12 has a wide-angle lens whose horizontal field angle is about, for example, 180 degrees. In the present embodiment, for example, as shown in FIG. 2, the camera 12 is attached to a center in a left-right direction at a rear portion of the vehicle 9, and can image a rear area of the vehicle 9. According to the camera 12, a rear center, left rear and right rear ground of the vehicle 9 can be imaged over a wide range.

In FIG. 1, the capturing control unit 13 has a function of controlling an capturing operation of the camera 12. The image conversion unit 14 has a function of performing bird's-eye conversion on the images obtained by capturing with the camera 12. The lane line detection unit 15 has a function of detecting lane lines on the street 1 using a plurality of continuously imaged images obtained by continuous capturing of the camera 12. The traveling lane recognition unit 16 has a function of recognizing a lane in which the vehicle 9 is traveling among the plurality of lanes on the street 1 based on the lane lines detected by the lane line detection unit 15. The storage device 17 is a semiconductor storage device having a semiconductor storage element such as a flash memory. A magnetic storage device such as a hard disk drive can also be used as the storage device 17.

The capturing control unit 13, the image conversion unit 14, the lane line detection unit 15, and the traveling lane recognition unit 16 are implemented as functions of a controller 18. That is, the controller 18 having a Central Processing Unit (CPU) or the like is mounted on the vehicle 9, and the controller 18 functions as the capturing control unit 13, the image conversion unit 14, the lane line detection unit 15, and the traveling lane recognition unit 16 by reading and executing computer programs stored in the storage device 17. The camera 12 and the storage device 17 are electrically connected to the controller 18, respectively. A vehicle speed sensor is electrically connected to the controller 18, and a vehicle speed signal output from the vehicle speed sensor is input to the controller 18. The vehicle speed signal is a signal indicating a traveling speed of the vehicle 9.

(Lane Line Detection Processing)

Figure 3:
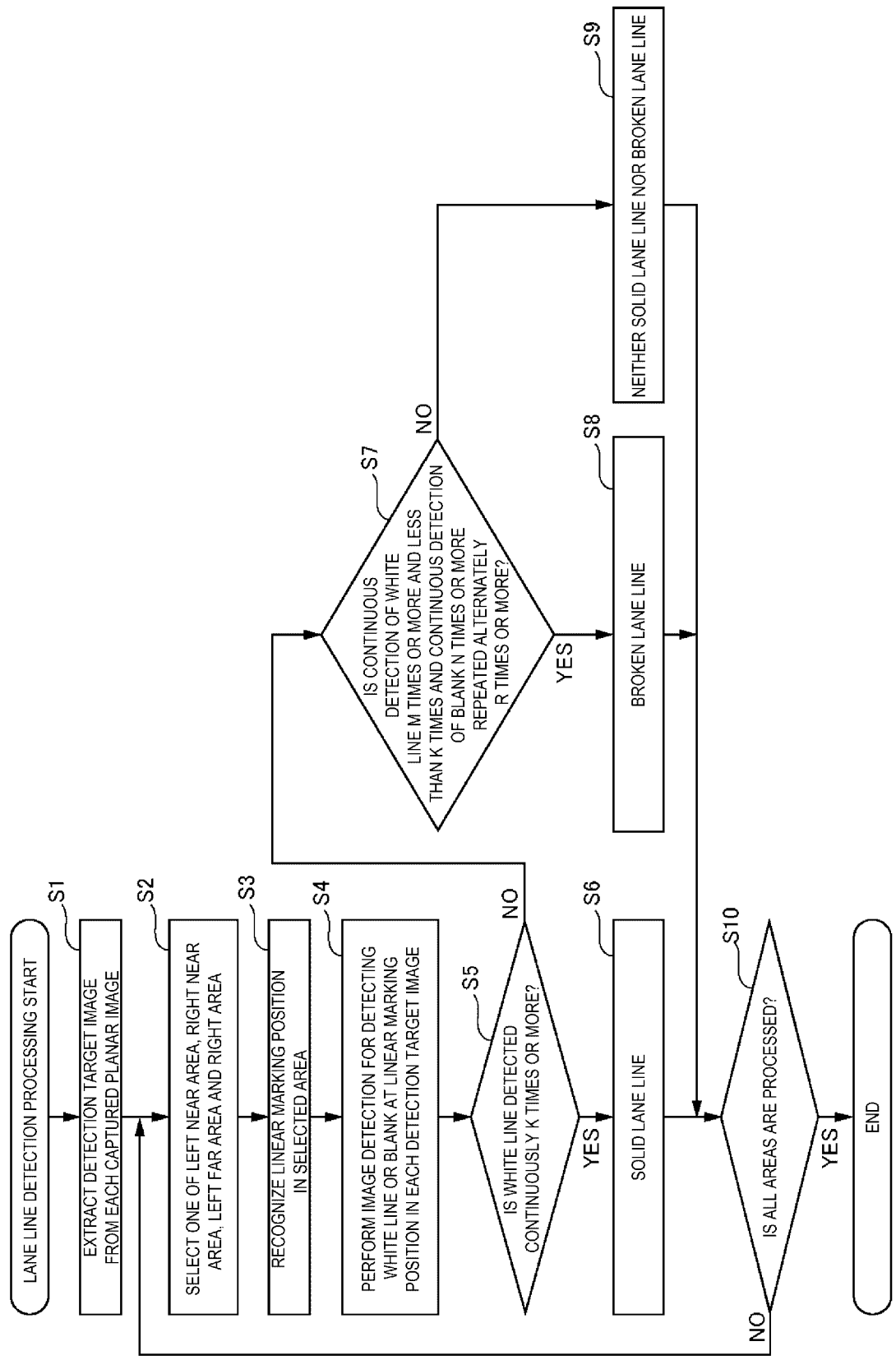
FIG. 3 is a flowchart showing lane line detection processing in the traveling lane recognition apparatus according to the embodiment of the present invention.

The traveling lane recognition apparatus 11 performs lane line detection processing of detecting lane lines of the street 1 based on the images obtained by capturing with the camera 12, and traveling lane recognition processing of recognizing a lane in which the vehicle 9 is traveling based on the lane lines detected in the lane line detection processing. The above processing is performed periodically, for example, while the vehicle 9 is traveling on the street 1. The lane line detection processing of the above processing will be described first. FIG. 3 shows contents of the lane line detection processing.

While the vehicle 9 is traveling on the street 1, the camera 12 continuously images the rear area of the vehicle 9 for several seconds at a frame rate of, for example, 30 fps, according to control of the capturing control unit 13. By the capturing, a plurality of images are obtained in which the rear area of the vehicle 9 is continuously imaged. These images are all images in which the rear area of the vehicle 9 is three-dimensionally shown. The image conversion unit 14 performs bird's-eye conversion on these images, and these images are converted into planar images in which the road surface of the street 1 is seen directly above. Hereinafter, an image obtained by performing bird's-eye conversion on an image that is captured by the camera 12 is referred to as a "captured planar image". A plurality of images captured continuously by the camera 12 are bird's-eye converted by the image conversion unit 14 to obtain a plurality of captured planar images. The plurality of captured planar images are stored in a work area of the storage device 17. The captured planar image is a specific example of the "captured image" in the claims.

Figure 4:
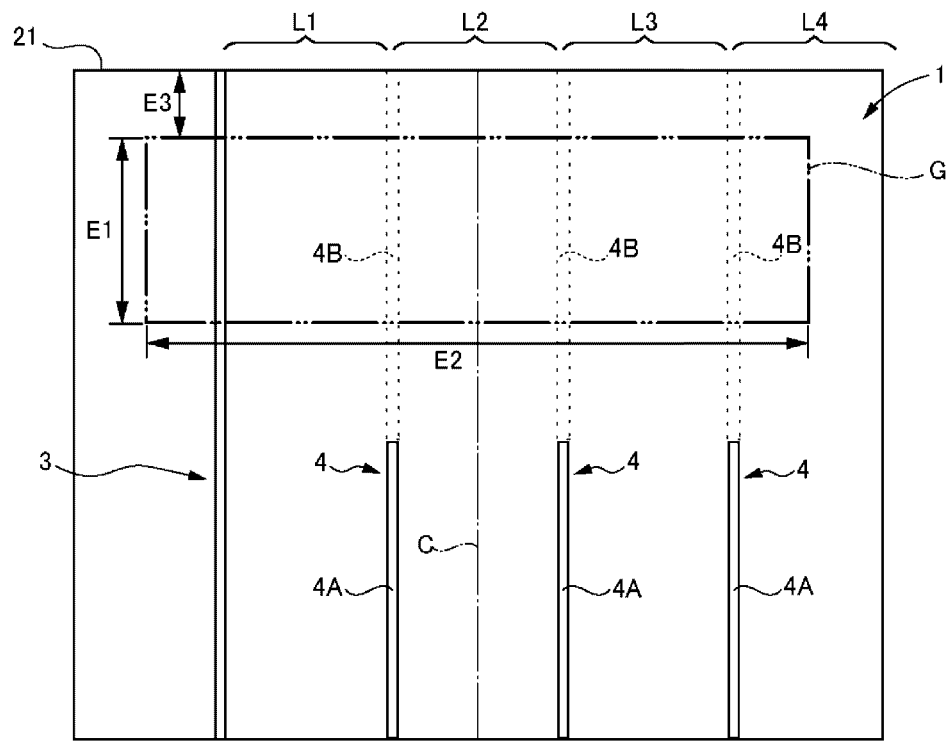
FIG. 4 is an explanatory diagram showing a captured planar image in the traveling lane recognition apparatus according to the embodiment of the present invention.
Figure 5:
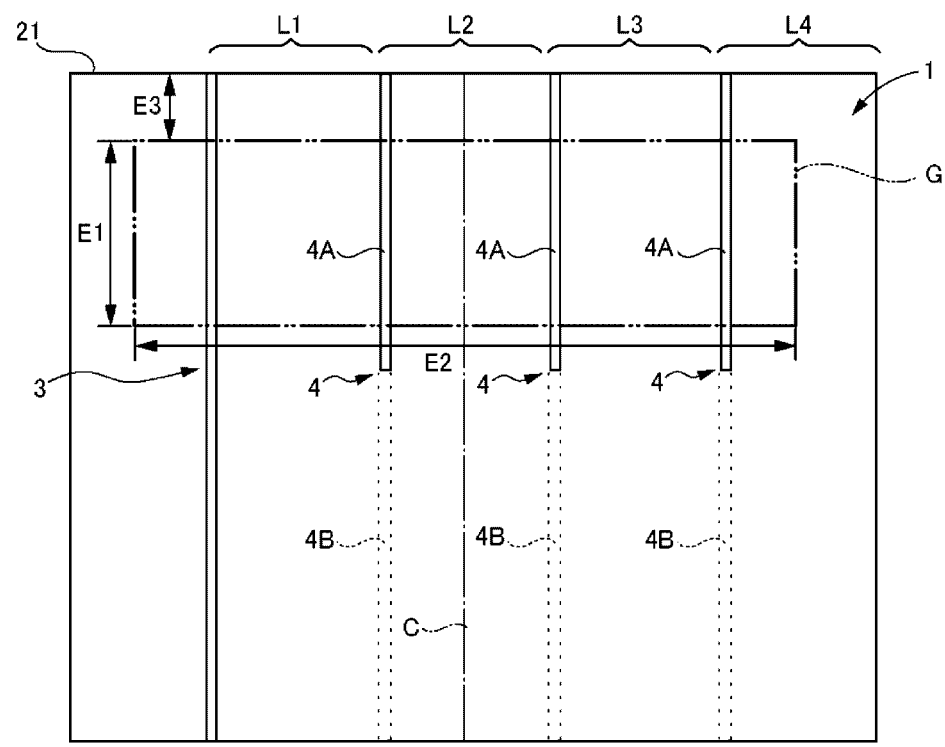
FIG. 5 is an explanatory diagram showing another captured planar image in the traveling lane recognition apparatus according to the embodiment of the present invention.

F in FIG. 2 indicates an example of a range of a captured planar image 21. FIGS. 4 and 5 each show an example of the captured planar image. The captured planar images 21 in FIGS. 4 and 5 are obtained by performing bird's-eye conversion on two images obtained by capturing the rear area of the vehicle 9 with the camera 12 at different timings while the vehicle 9 is traveling on the lane L2 of the street 1.

The lane line detection unit 15 performs lane line detection processing using the plurality of captured planar images 21 stored in the work area of the storage device 17. That is, in FIG. 3, the lane line detection unit 15 first extracts images in the same range in the respective captured planar images 21 as detection target images from the respective captured planar images 21 (step S1).

In FIGS. 4 and 5, G indicates a range in which the detection target image is extracted from each captured planar image 21. Hereinafter, the range is referred to as "extraction range". A length E1 in the front-rear direction of the extraction range G is shorter than the length D1 of the white line portion 4A of the lane boundary line 4 and is also shorter than the length D2 of the blank portion 4B of the lane boundary line 4. In the present embodiment, the length E1 is set to 5 m, for example, on the actual street on the premise that the length D1 of the white line portion 4A is 8 m and the length D2 of the blank portion 4B is 12 m. A length E2 in the left-right direction of the extraction range G is three or more times the width D3 of one lane. In the present embodiment, the length E2 is set to 14 m, for example, on the actual street on the premise that the width D3 of the lane is 3.5 m. A position in the front-rear direction of the extraction range G in each captured planar image 21 is, for example, a position away from an upper end of each captured planar image 21 by a predetermined distance E3. In the present embodiment, the distance E3 is set to 0.5 m, for example, on the actual street. A center position in the left-right direction of the extraction range G in each captured planar image 21 matches, for example, a center position in the left-right direction of each captured planar image 21.

Here, in the present embodiment, since the camera 12 is disposed at the center in the left-right direction at the rear portion of the vehicle 9, as shown in FIG. 4 or 5, a center position C in the left-right direction of each captured planar image 21 corresponds to a center position in the left-right direction of the vehicle 9. Therefore, the center position C in the left-right direction of the extraction range G corresponds to the center position in the left-right direction of the vehicle 9, and a center position in the left-right direction of the detection target image also corresponds to the center position in the left-right direction of the vehicle 9.

Figure 6:
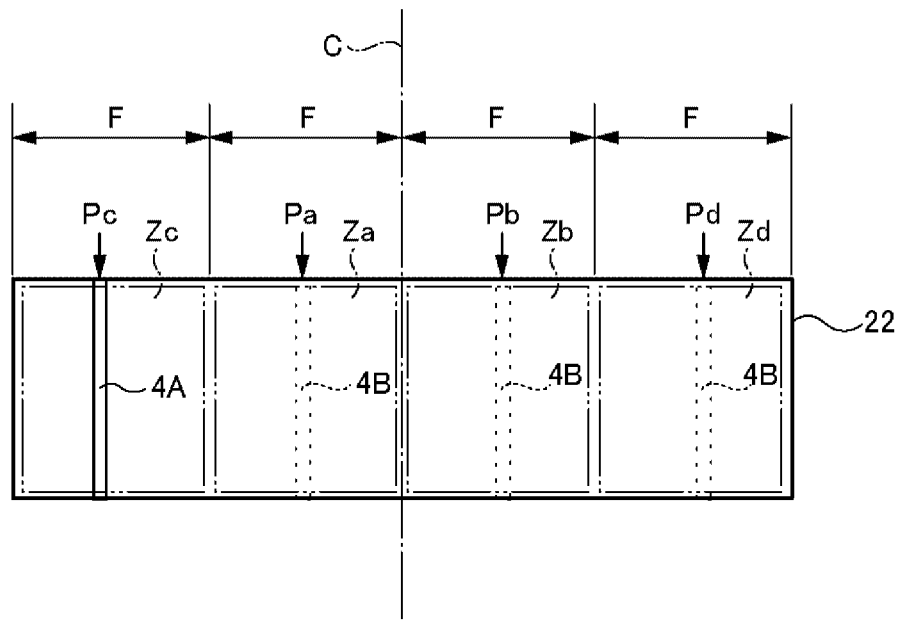
FIG. 6 is an explanatory diagram showing a detection target image in the traveling lane recognition apparatus according to the embodiment of the present invention.
Figure 7:
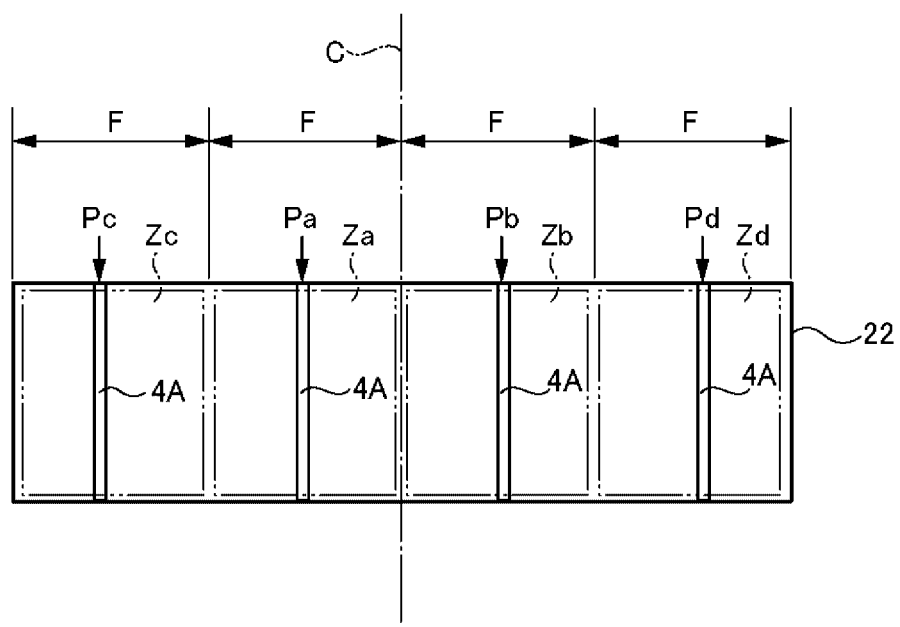
FIG. 7 is an explanatory diagram showing another detection target image in the traveling lane recognition apparatus according to the embodiment of the present invention.

In step S1 in FIG. 3, a detection target image is extracted from each of the plurality of captured planar images stored in the work area of the storage device 17. The extracted plurality of detection target images are stored in the work area of the storage device 17. FIGS. 6 and 7 show examples of the detection target images, respectively. A detection target image 22 in FIG. 6 is extracted from the captured planar image 21 in FIG. 4. A detection target image 22 in FIG. 7 is extracted from the captured planar image 21 in FIG. 5. A length in the front-rear direction and a length in the left-right direction of each detection target image 22 are equal to the length E1 in the front-rear direction and the length E2 in the left-right direction of the extraction range G, respectively.

Subsequently, the lane line detection unit 15 selects one of a left near area Za, a right near area Zb, a left far area Zc, and a right far area Zd (step S2). In the present embodiment, as shown in FIGS. 6 and 7, the left near area Za, the right near area Zb, the left far area Zc, and the right far area Zd are set for each detection target image 22. The left near area Za is an area where existence of a first lane line on the left of the vehicle 9 is estimated. Specifically, the left near area Za is an area between the center position C in the left-right direction of the detection target image 22 and a position away from the center position C by a distance F to the left.

The distance F is set to a value equal to the lane width D3 on the actual street, for example. The right near area Zb is an area where existence of a first lane line on the right of the vehicle 9 is estimated. Specifically, the right near area Zb is an area between the center position C in the left-right direction of the detection target image 22 and a position away from the center position C by the distance F to the right. The left far area Zc is an area where existence of a second lane line on the left of the vehicle 9 is estimated. Specifically, the left far area Zc is an area between a position away from the center position C in the left-right direction of the detection target image 22 by the distance F to the left and a position away from the above position by the distance F to the left. The right far area Zd is an area where existence of a second lane line on the right of the vehicle 9 is estimated. Specifically, the right far area Zd is an area between a position away from the center position C in the left-right direction of the detection target image 22 by the distance F to the right and a position away from the above position by the distance F to the right. In the lane line detection processing of the present embodiment, the processing of detecting a lane line is sequentially performed on each of the left near area Za, the right near area Zb, the left far area Zc, and the right far area Zd. The order of performing the lane line detection for these four areas is freely selected. In the present embodiment, the processing of detecting the lane line is performed in the order of the left near area Za, the right near area Zb, the left far area Zc, and the right far area Zd. Therefore, in step S2, the lane line detection unit 15 first selects the left near area Za.

Subsequently, the lane line detection unit 15 recognizes a linear marking position Pa in the left near area Za selected in Step S2 (Step S3). The "linear marking" is a linear marking marked on the road surface. The "linear marking position" is a position in the left-right direction of the linear marking in the detection target image 22. Specifically, the lane line detection unit 15 uses each detection target image 22 stored in the storage device 17 to, first, recognize a linear marking existing in the left near area Za of each detection target image 22, and then recognize a linear marking position Pa (see FIG. 6 or 7) of the recognized linear marking.

The linear marking can be recognized based on a luminance difference between the linear marking and the road surface. Hough transform may be used for recognizing the linear marking.

The linear marking position Pa can be recognized as follows, for example. That is, when the first lane on the left of the vehicle 9 is a broken lane line, that is, the lane boundary line 4 as shown in FIG. 2, the plurality of detection target images 22 stored in the work area of the storage device 17 in step S1 include an image in which no linear marking exists in the left near area Za as shown in FIG. 6 and an image in which a linear marking exists in the left near area Za as shown in FIG. 7. Meanwhile, when the first lane line on the left of the vehicle 9 is a solid lane line, that is, the street outer line 3, although not shown, a linear marking may exist in the left near areas Za of all detection target images 22 stored in the work area of the storage device 17 in step S1. In any of these cases, the lane line detection unit 15 selects all or some of the detection target images 22 in which the linear marking exists in the left near area Za from among the plurality of detection target images 22 stored in the work area of the storage device 17 in step S1, and recognizes the linear marking position Pa, for example, based on an average value or a mode value of position coordinates of the linear markings existing in the left near areas Za of the selected detection target images.

Subsequently, the image detection processing in which the lane line detection unit 15 detects a white line or a blank at the linear marking position Pa in each detection target image 22 is repeated for the plurality of detection target images 22 stored in the work area of the storage device 17 in step S1 in the order of capturing time points of the detection target images 22 (step S4). Here, the capturing time point of the detection target image 22 means a time point when the image before the bird's-eye conversion of the capturing planar image 21 corresponding to the detection target image 22 is captured by the camera 12. The detection of the white line or the blank can be performed by the same method as the above-described linear marking recognition method.

For example, when one of the plurality of detection target images 22 stored in the work area of the storage device 17 is the detection target image 22 as shown in FIG. 6, a blank is detected at the linear marking position Pa in the detection target image 22. Meanwhile, when one of the plurality of detection target images 22 stored in the work area of the storage device 17 is the detection target image 22 as shown in FIG. 7, a white line is detected at the linear marking position Pa in the detection target image 22.

After the image detection processing is completed, the lane line detection unit 15 determines, based on the result of the image detection processing, whether the linear marking existing at the linear marking position Pa corresponds to a solid lane line, corresponds to a broken lane line, or corresponds to neither a solid lane line nor a broken lane line.

That is, when the white line is continuously detected, the image detection processing, at the linear marking positions Pa in the plurality of detection target images stored in the work area of the storage device 17 in step S1 for a first reference number of times k or more (Step S5: YES), the lane line detection unit 15 determines that the linear marking existing at the linear marking position Pa corresponds to a solid lane line (step S6). Further, the lane line detection unit 15 stores, in the storage device 17, information indicating that a solid lane line exists at the linear marking position Pa in the left near area Za. The information is used in the traveling lane recognition processing to be described later.

The first reference number of times k is a natural number of 2 or more, and is a value that changes at least according to the traveling speed of the vehicle 9. The lane line detection unit 15 sets the first reference number of times k as follows. That is, when it is assumed that an ideal lane boundary line is captured by the camera 12 while the vehicle 9 is traveling, the lane line detection unit 15 calculates the number of times that the detection target image 22 in which the blank portion in the ideal lane boundary line is not included is continuously obtained, based on a length in the front-rear direction of the white line portion of the ideal lane boundary line, a length in the front-rear direction of the detection target image 22 (the length E1 in the front-rear direction of the extraction range G), the traveling speed of the vehicle 9, and the frame rate of the camera 12, and sets a number of times greater than this number of times as the first reference number of times k. The ideal lane boundary line means a complete lane boundary line in which there is no disappearance in the white line portion of the lane boundary line, and no blank portion of the lane boundary line is erroneously detected as a white line.

In the present embodiment, the length D1 of the white line portion 4A of the lane boundary line 4 is 8 m, the length in the front-rear direction of the detection target image 22 is, for example, 5 m, and the frame rate of the camera 12 is, for example, 30 fps. It is assumed that the traveling speed of the vehicle 9 is recognized to be 100 km/h based on the vehicle speed signal output from the vehicle speed sensor. Under this condition, when it is assumed that an ideal lane boundary line is captured by the camera 12 while the vehicle 9 is traveling, since a difference between the length in the front-rear direction of the white line portion 4A of the lane boundary line 4 and the length in the front-rear direction of the detection target image 22 is 3 m, a time required for the vehicle 9 to move 3 meters at the speed of 100 km/h is 0.108 seconds and the frame rate of the camera is 30 fps, the number of times that the detection target image 22 in which the blank portion in the ideal lane boundary line is not included is continuously obtained is 3. Under this condition, when the linear marking existing at the linear marking position Pa is an ideal street outer line or an ideal street center line, as a result of the image detection processing, the white line is continuously detected at the linear marking position Pa in the plurality of detection target images 22 more than three times. Therefore, under the above condition, the lane line detection unit 15 sets the number of times more than 3, for example, 4 as the first reference number of times k. Accordingly, when the white line is continuously detected at the linear marking positions Pa in the plurality of detection target images 22 stored in the work area of the storage device 17 in step S1 in the image detection processing four times or more, the lane line detection unit 15 determines that the linear marking existing at the linear marking position Pa corresponds to a solid lane line. The ideal street outer line means a complete street outer line in which there is no disappearance in the white line portion, and the ideal street center line means a complete street center line in which there is no disappearance in the white line portion.

In the above condition, when it is recognized that the traveling speed of the vehicle 9 is 80 km/h based on the vehicle speed signal, since a time required for the vehicle 9 to move 3 m is 0.135 seconds, the number of times that the detection target image 22 in which the blank portion in the ideal lane boundary line is not included is continuously obtained is 4 when it is assumed that the ideal lane boundary line is captured by the camera 12 while the vehicle 9 is traveling. In this case, the lane line detection unit 15 sets the number of times greater than 4, for example, 5 as the first reference number of times k. Accordingly, when the white line is continuously detected at the linear marking positions Pa in the plurality of detection target images 22 stored in the work area of the storage device 17 in step S1 in the image detection processing five times or more, the lane line detection unit 15 determines that the linear marking existing at the linear marking position Pa corresponds to a solid lane line.

Meanwhile, in the image detection processing, at the linear marking position Pa in the plurality of detection target images stored in the work area of the storage device 17 in step S1, when continuous detection of the white line with a second reference number of times m or more and less than the first reference number of times k and continuous detection of the blank with a third reference number of times n or more are alternately repeated for a fourth reference number of times r or more (Step S7: YES), the lane line detection unit 15 determines that the linear marking existing at the linear marking position Pa corresponds to a broken lane line (step S8). Further, the lane line detection unit 15 stores, in the storage device 17, information indicating that a broken lane line exists at the linear marking position Pa in the left near area Za. The information is used in the traveling lane recognition processing to be described later.

The second reference number of times m is a natural number, and is a preset fixed value in the present embodiment. The second reference number of times m is 1 or more and less than the first reference number of times k, and is set to 1, for example.

The third reference number of times n is a natural number and is a value that changes at least according to the traveling speed of the vehicle 9. The lane line detection unit 15 sets the third reference number of times n as follows. That is, when it is assumed that an ideal lane boundary line is captured by the camera 12 while the vehicle 9 is traveling, the lane line detection unit 15 calculates the number of times that the detection target image 22 in which the white line portion in the ideal lane boundary line is not included is continuously obtained, based on a length in the front-rear direction of the blank portion of the ideal lane boundary line, a length in the front-rear direction of the detection target image 22 (the length E1 in the front-rear direction of the extraction range G), the traveling speed of the vehicle 9, and the frame rate of the camera 12, and sets this number of times as the third reference number of times n.

In the present embodiment, the length D2 of the blank portion 4B of the lane boundary line 4 is 12 m, the length in the front-rear direction of the detection target image 22 is, for example, 5 m, and the frame rate of the camera 12 is, for example, 30 fps. It is assumed that the traveling speed of the vehicle 9 is recognized to be 100 km/h based on the vehicle speed signal output from the vehicle speed sensor. Under this condition, when it is assumed that an ideal lane boundary line is captured by the camera 12 while the vehicle 9 is traveling, since a difference between the length in the front-rear direction of the blank portion of the lane boundary line and the length in the front-rear direction of the detection target image 22 is 7 m, a time required for the vehicle 9 to move 7 meters at the speed of 100 km/h is 0.252 seconds and the frame rate of the camera is 30 fps, the number of times that the detection target image 22 in which the white line portion in the ideal lane boundary line is not included is continuously obtained is 7. Therefore, the lane line detection unit 15 sets 7 as the third reference number of times n.

The lane line detection unit 15 sets the fourth reference number of times r to 3, for example. That is, when a combination of one white line portion 4A and one blank portion 4B following the white line portion 4A in the lane boundary line 4 is referred to as "lane boundary line unit", a length in the front-rear direction of one lane boundary line unit is 20 m. Therefore, the vehicle 9 passes at least four lane boundary line units, for example, while moving 100 m. By setting the fourth reference number of times r to, for example, 3, the detection of the lane line can be completed before the vehicle 9 has moved 100 m since the detection of the lane line is started. Therefore, in the image detection processing, at the linear marking position Pa in the plurality of detection target images stored in the work area of the storage device 17 in step S1, when continuous detection of the white line with one time or more and less than four times and continuous detection of the blank with seven times or more are alternately repeated three or more times, the lane line detection unit 15 determines that the linear marking existing at the linear marking position Pa corresponds to a broken lane line.

In the above condition, when it is recognized that the traveling speed of the vehicle 9 is 80 km/h based on the vehicle speed signal, since a time required for the vehicle 9 to move 7 m is 0.315 seconds, the number of times that the detection target image 22 in which the white line portion in the ideal lane boundary line is not included is continuously obtained is nine times when it is assumed that the ideal lane boundary line is captured by the camera 12 while the vehicle 9 is traveling. In this case, the lane line detection unit 15 sets 9 as the third reference number of times n. As described above, when it is recognized that the traveling speed of the vehicle 9 is 80 km/h, the lane line detection unit 15 sets, for example, 5 as the first reference number of times k. Therefore, in a case where it is recognized that the traveling speed of the vehicle 9 is 80 km/h, in the image detection processing, when, at the linear marking position Pa in the plurality of detection target images stored in the work area of the storage device 17 in step S1, continuous detection of the white line with one time or more and less than 5 times and continuous detection of the blank with nine times or more are alternately repeated three or more times, the lane line detection unit 15 determines that the linear marking existing at the linear marking position Pa corresponds to a broken lane line.

Meanwhile, in the image detection processing, at the linear marking position Pa in the plurality of detection target images stored in the work area of the storage device 17 in step S1, when the white line is not continuously detected for the first reference number of times k or more, and continuous detection of the white line with the second reference number of times m or more and less than the first reference number of times k and continuous detection of the blank with the third reference number of times n or more are not alternately repeated for the fourth reference number of times r or more (Step S5: NO and Step S7: NO), the lane line detection unit 15 determines that the linear marking existing at the linear marking position Pa corresponds to neither a solid lane line nor a broken lane line (step S9). In this case, for example, the lane line detection unit 15 performs capturing with the camera 12 again and executes the lane line detection process again, or outputs an error signal. The error signal is input to, for example, an automatic driving control device that controls automatic driving of the vehicle 9. In response, error processing or the like is executed by the automatic driving control device.

Subsequently, the lane line detection unit 15 determines whether the processing for detecting the lane line, that is, the processing from step S3 to step S9 is completed (step S10) for all areas of the left near area Za, the right near area Zb, the left far area Zc, and the right far area Zd. When the processing of detecting the lane line for all these area has not been completed (step S10: NO), the lane line detection unit 15 returns the processing to step S2, and then selects an area in which the lane line is to be detected in step S2. Meanwhile, when the processing for detecting the lane line completed for all areas of the left near area Za, the right near area Zb, the left far area Zc, and the right far area Zd, the lane line detection processing ends.

(Traveling Lane Recognition Processing)

Figure 8:
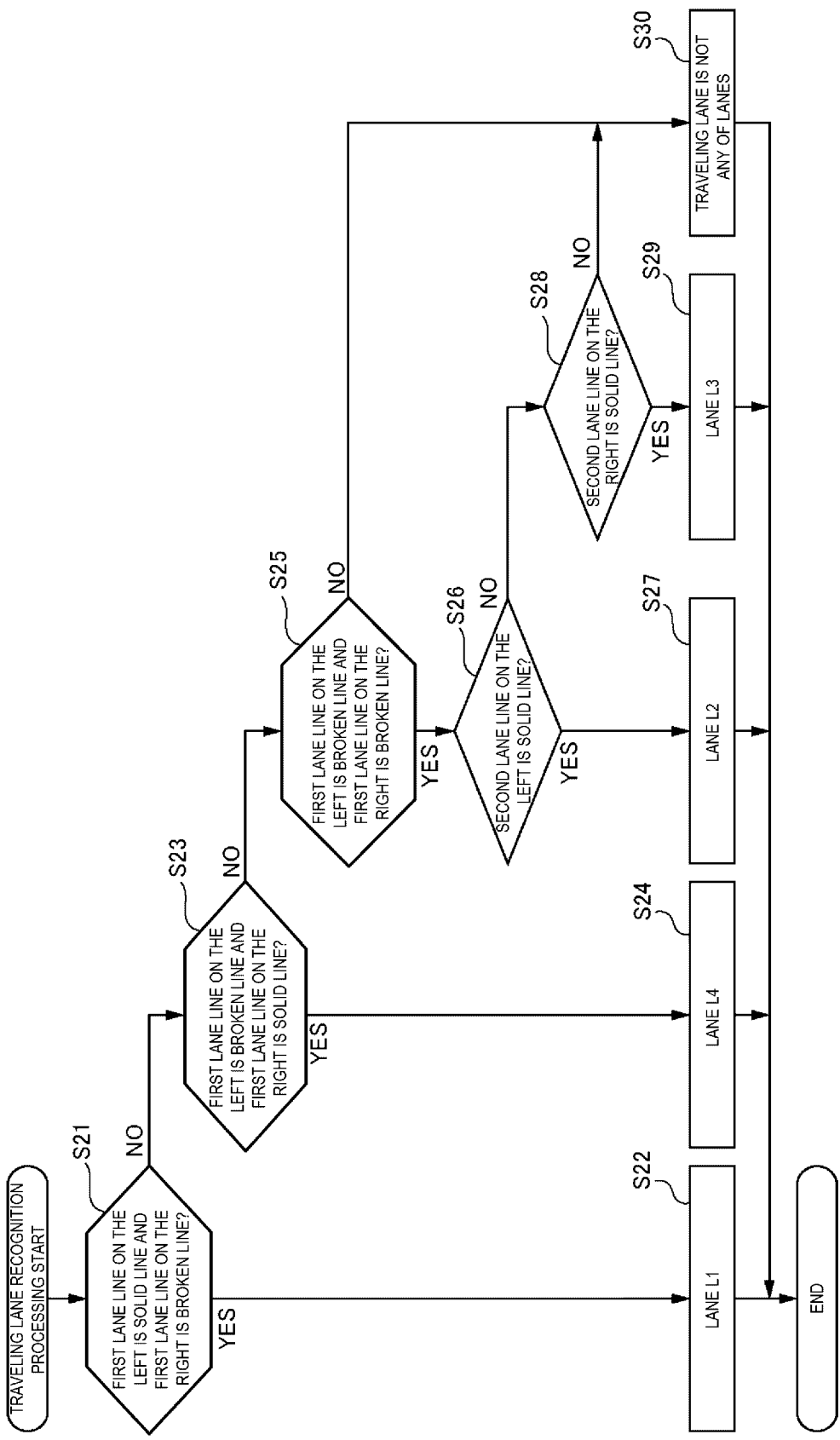
FIG. 8 is a flowchart showing traveling lane recognition processing in the traveling lane recognition apparatus according to the embodiment of the present invention.
Figure 9:
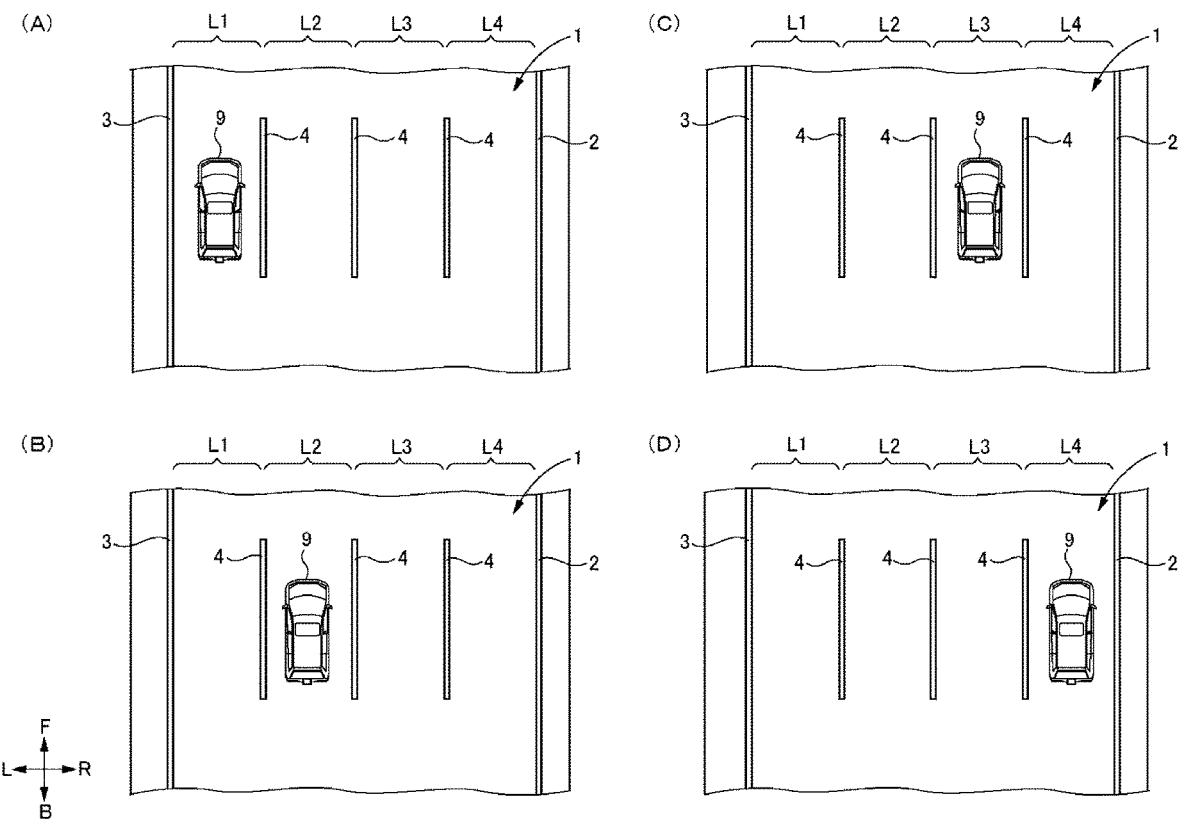
FIG. 9 is an explanatory diagram showing a state where the vehicle is traveling in each of the four lanes.

Next, the traveling lane recognition processing will be described. FIG. 8 shows contents of the traveling lane recognition processing. FIG. 9 shows a state in which the vehicle 9 is traveling in the respective lanes L1, L2, L3, and L4. In the traveling lane recognition processing shown in FIG. 8, the traveling lane recognition unit 16 determines whether the first lane line on the left of the vehicle 9 is a solid line and the first lane line on the right of the vehicle 9 is a broken line based on the result of the lane line detection processing (Step S21). Specifically, the traveling lane recognition unit 16 determines whether a solid lane line exists at the linear marking position Pa in the left near area Za and a broken lane line exists at a linear marking position Pb in the right near area Zb. As described above, the left near area Za is an area where existence of the first lane line on the left of the vehicle 9 is estimated. The existence of a solid lane line at the linear marking position Pa in the left near area Za can be equated with a fact that the first lane line on the left of the vehicle 9 is a solid line. Similarly, the right near area Zb is an area where existence of the first lane line on the right of the vehicle 9 is estimated. The existence of a solid lane line at the linear marking position Pb in the right near area Zb can be equated with a fact that the first lane line on the right of the vehicle 9 is a solid line.

When a solid lane line exists at the linear marking position Pa in the left near area Za and a broken lane line exists at the linear marking position Pb in the right near area Zb, that is, when the first lane line on the left of the vehicle 9 is a solid line and the first lane line on the right of the vehicle 9 is a broken line (step S21: YES), the traveling lane recognition unit 16 determines that the lane in which the vehicle 9 is traveling is the lane L1 as shown in FIG. 9A (step S22).

Meanwhile, when a solid lane line does not exist at the linear marking position Pa in the left near area Za and a broken lane line does not exist at the linear marking position Pb in the right near area Zb, that is, when the first lane line on the left of the vehicle 9 is not a solid line and the first lane line on the right of the vehicle 9 is not a broken line (step S21: NO), the traveling lane recognition unit 16 subsequently determines, based on the result of the lane line detection processing, whether the first lane line on the left of the vehicle 9 is a broken line and the first lane line on the right of the vehicle 9 is a solid line. (Step S23). Specifically, the traveling lane recognition unit 16 determines whether a broken lane line exists at the linear marking position Pa in the left near area Za and a solid lane line exists at the linear marking position Pb in the right near area Zb.

When a broken lane line exists at the linear marking position Pa in the left near area Za and a solid lane line exists at the linear marking position Pb in the right near area Zb, that is, when the first lane line on the left of the vehicle 9 is a broken line and the first lane line on the right of the vehicle 9 is a solid line (step S23: YES), the traveling lane recognition unit 16 determines that the lane in which the vehicle 9 is traveling is the lane L4 as shown in FIG. 9D (step S24).

Meanwhile, when a broken lane line does not exist at the linear marking position Pa in the left near area Za and a solid lane line does not exist at the linear marking position Pb in the right near area Zb, that is, when the first lane line on the left of the vehicle 9 is not a broken line and the first lane line on the right of the vehicle 9 is not a solid line (step S23: NO), the traveling lane recognition unit 16 subsequently determines, based on the result of the lane line detection processing, whether the first lane line on the left of the vehicle 9 is a broken line and the first lane line on the right of the vehicle 9 is a broken line (Step S25). Specifically, the traveling lane recognition unit 16 determines whether a broken lane line exists at the linear marking position Pa in the left near area Za and a broken lane line exists at the linear marking position Pb in the right near area Zb.

When a broken lane line exists at the linear marking position Pa in the left near area Za and a broken lane line exists at the linear marking position Pb in the right near area Zb, that is, when the first lane line on the left of the vehicle 9 is a broken line and the first lane line on the right of the vehicle 9 is a broken line (step S25: YES), the traveling lane recognition unit 16 subsequently determines, based on the result of the lane line detection processing, whether the second lane line on the left of the vehicle 9 is a solid line (Step S26). Specifically, the traveling lane recognition unit 16 determines whether a solid lane line exists at a linear marking position Pc in the left far area Zc. As described above, the left far area Zc is an area where existence of the second lane line on the left of the vehicle 9 is estimated. The existence of a solid lane line at the linear marking position Pc in the left far area Zc can be equated with a fact that the second lane line on the left of the vehicle 9 is a solid line.

When a solid lane line exists at the linear marking position Pc in the left far area Zc, that is, when the second lane line on the left of the vehicle 9 is a solid line (step S26: YES), the traveling lane recognition unit 16 determines that the lane in which the vehicle 9 is traveling is the lane L2 as shown in FIG. 9B (step S27).

Meanwhile, when a solid lane line does not exist at the linear marking position Pc in the left far area Zc, that is, when the second lane line on the left of the vehicle 9 is not a solid line (step S26: NO), the traveling lane recognition unit 16 determines, based on the result of the lane line detection processing, whether the second lane line on the right of the vehicle 9 is a solid line (Step S28). Specifically, the traveling lane recognition unit 16 determines whether a solid lane line exists at a linear marking position Pd in the right far area Zd. As described above, the right far area Zd is an area where existence of the second lane line on the right of the vehicle 9 is estimated. The existence of a solid lane line at the linear marking position Pd in the right far area Zd can be equated with a fact that the second lane line on the right of the vehicle 9 is a solid line.

When a solid lane line exists at the linear marking position Pd in the right far area Zd, that is, when the second lane line on the right of the vehicle 9 is a solid line (step S28: YES), the traveling lane recognition unit 16 determines that the lane in which the vehicle 9 is traveling is the lane L3 as shown in FIG. 9C (step S29).

Meanwhile, when a solid lane line does not exist at the linear marking position Pd in the right far area Zd, that is, when the second lane line on the right of the vehicle 9 is not a solid line (step S28: NO), the traveling lane recognition unit 16 determines that the lane in which the vehicle 9 is traveling is not any lane. When a broken lane line does not exist at the linear marking position Pa in the left near area Za and a broken lane line also does not exist at the linear marking position Pb in the right near area Zb, that is, when the first lane line on the left of the vehicle 9 is not a broken line and the first lane line on the right of the vehicle 9 is not a broken line (Step S25: NO), the traveling lane recognition unit 16 determines that the lane in which the vehicle 9 is traveling is not any lane. In this case, the traveling lane recognition unit 16 recognizes that the street has one lane on one side, or outputs an error signal.

As described above, the traveling lane recognition apparatus 11 according to the embodiment of the present invention determines that the linear marking existing at the linear marking position is a broken lane line when, at the linear marking position in the plurality of detection target images 22, continuous detection of a white line one time or more and less than the first reference number of times k and continuous detection of a blank with a third reference number of times n (n is a natural number) is repeated alternately a plurality of number of times in the lane line detection processing. According to the determination method, it is possible to determine whether the linear marking existing at the linear marking position in the plurality of detection target images 22 has, for example, a structural feature in which a white line whose length is not specified and a blank of 12 m exist alternately, and based on the determination, it is possible to recognize whether the marking on the street is the lane boundary line 4. Therefore, it is possible to prevent the marking on the street from being erroneously recognized as the lane boundary line 4 even though the marking is not the lane boundary line 4. Specifically, even in a case where a part of the street center line 2 or the street outer line 3 disappears and has a broken line shape, it is possible to prevent such street center line 2 or street outer line 3 from being erroneously detected as the lane boundary line 4. Further, it is possible to prevent road markings other than the lane lines from being erroneously detected as the lane boundary line 4. Further, the lane in which the vehicle 9 is traveling can be recognized with high accuracy based on the high accuracy detection result of the lane boundary line 4.

The traveling lane recognition apparatus 11 according to the present embodiment sets the length E1 in the front-rear direction of the extraction range G in which the detection target image 22 is extracted from the captured planar image 21 to be shorter than the length D2 in the front-rear direction of the blank portion 4B of the lane boundary line 4 in the lane line detection processing. Further, when it is assumed that an ideal lane boundary line is captured by the camera 12 while the vehicle 9 is traveling, the number of times that the detection target image 22 in which the white line portion in the ideal lane boundary line is not included is continuously obtained is calculated, based on the length in the front-rear direction of the blank portion of the ideal lane boundary line, the length in the front-rear direction of the detection target image 22 (the length E1 in the front-rear direction of the extraction range G), the traveling speed of the vehicle 9, and the frame rate of the camera 12, and this number of times is set as the third reference number of times n. According to such setting, it is possible to determine, with high accuracy, whether the linear marking existing at the linear marking position in the plurality of detection target images 22 has, for example, a structural feature in which a white line whose length is not specified and a blank of 12 m exist alternately, and it is possible to recognize whether the marking on the street is the lane boundary line 4 with high accuracy.

The traveling lane recognition apparatus 11 according to the present embodiment sets the length E1 in the front-rear direction of the extraction range G in which the detection target image 22 is extracted from the captured planar image 21 to be shorter than the length D1 in the front-rear direction of the white line portion 4A of the lane boundary line 4 in the lane line detection processing. Further, when it is assumed that an ideal lane boundary line is captured by the camera 12 while the vehicle 9 is traveling, the number of times that the detection target image 22 in which the blank portion in the ideal lane boundary line is not included is continuously obtained is calculated, based on the length in the front-rear direction of the white line portion of the ideal lane boundary line, the length in the front-rear direction of the detection target image 22 (the length E1 in the front-rear direction of the extraction range G), the traveling speed of the vehicle 9, and the frame rate of the camera 12, and a number larger than this number of times is set as the first reference number of times k. According to such setting, it is possible to determine whether the linear marking existing at the linear marking position in the plurality of detection target images 22 is longer than the white line portion 4A of the lane boundary line 4, and it is possible to recognize with high accuracy whether the linear marking is a solid lane line (street center line 2 or street outer line 3).

In the traveling lane recognition processing, the traveling lane recognition apparatus 11 according to the present embodiment determines that the lane in which the vehicle 9 is traveling is the lane L1 when the first lane line on the left of the vehicle 9 is a solid line, and determines that the lane in which the vehicle 9 is traveling is the lane L2 when the second lane line on the left of the vehicle 9 is a solid line. That is, when a t-th (t is a nature number) lane line on the left of the vehicle 9 is a solid lane line, the traveling lane recognition apparatus 11 determines that the lane in which the vehicle 9 is traveling is a t-th lane from the left end on one side of the street 1 (left end of the street in Japan). In the traveling lane recognition processing, the traveling lane recognition apparatus 11 according to the present embodiment determines that the lane in which the vehicle 9 is traveling is the lane L4 when the first lane line on the right of the vehicle 9 is a solid line, and determines that the lane in which the vehicle 9 is traveling is the lane L3 when the second lane line on the right of the vehicle 9 is a solid line. That is, when a t-th lane line on the right of the vehicle 9 is a solid lane line, the traveling lane recognition apparatus 11 determines that the lane in which the vehicle 9 is traveling is a t-th lane from the right end on one side of the street 1 (center line or central strip of the street in Japan). According to this determination method, the lane in which the vehicle 9 is traveling can be recognized even when the vehicle 9 is traveling on a lane with many lanes on one side.

In the traveling lane recognition processing, the traveling lane recognition apparatus 11 according to the present embodiment determines that the lane in which the vehicle 9 is traveling is the lane L1, when the first lane line on the left of the vehicle 9 is a solid line and the first lane line on the right of the vehicle 9 is a broken line. Further, the traveling lane recognition apparatus 11 determines that the lane in which the vehicle 9 is traveling is the lane L4, when the first lane line on the right of the vehicle 9 is a solid line and the first lane line on the left of the vehicle 9 is a broken line. Further, the traveling lane recognition apparatus 11 determines that the lane in which the vehicle 9 is traveling is the lane L2, when the first lane line on the left of the vehicle 9 is a broken line, the first lane line on the right of the vehicle 9 is a broken line, and the second lane line on the left of the vehicle 9 is a solid line. Further, the traveling lane recognition apparatus 11 determines that the lane in which the vehicle 9 is traveling is the lane L3, when the first lane line on the left of the vehicle 9 is a broken line, the first lane line on the right of the vehicle 9 is a broken line, and the second lane line on the right of the vehicle 9 is a solid line. According to such a determination method, the lane in which the vehicle 9 is traveling can be recognized accurately.

According to the traveling lane recognition apparatus 11 of the present embodiment, the lane in which the vehicle 9 is traveling can be recognized when the vehicle 9 is traveling on the street 1 with four or more lanes on each side, by adopting such a traveling lane recognition method and setting the length E2 in the left-right direction of the extraction range G form which the detection target image 22 is extracted from the captured planar image 21 to be three or more times the width D3 of the lane.

According to the traveling lane recognition apparatus 11 of the present embodiment, the detection of the lane line of the street and recognition of the lane in which the vehicle is traveling can be performed using the camera without using an advanced GPS or a LIDAR device, or laser radar. Therefore, the detection of the lane line of the street, and the recognition of the lane in which the vehicle is traveling can be realized at low cost.

In the above embodiment, a case in which the camera 12 is provided at the rear portion of the vehicle 9 to capture an image of the rear area of the vehicle 9 has been described as an example, but the camera may be provided at a front portion of the vehicle 9 to capture an image of a front area of the vehicle 9. The camera may be provided on both left and right portions of the vehicle 9 to capture both left and right areas of the vehicle 9.

In the above embodiment, the length E2 in the left-right direction of the extraction range G in which the detection target image 22 is extracted from the captured planar image 21 is set to, for example, 14 m. According to the setting, as shown in FIG. 4, the first and second lane lines on the left of the vehicle 9 and the first and second lane lines on the right of the vehicle 9 are reflected in the detection target image 22. In this case, the number of lanes on one side of the street on which the traveling lane of the vehicle 9 can be recognized is 4 in the traveling lane recognition processing. When the length E2 in the left-right direction of the extraction range G is set larger than the above, and the third or more lane lines on the left of the vehicle 9 and the third or more lane lines on the right of the vehicle 9 are reflected in the detection target image 22, the number of lanes on one side of the street on which the traveling lane of the vehicle 9 can be recognized can be increased.

In the above embodiment, a case in which it is assumed that the street 1 on which the vehicle 9 travels is an expressway, the length in the front-rear direction of the white line portion of the lane boundary line 4 is 8 m, and the length in the front-rear direction of the blank portion 4B is 12 m is described as an example, but the present invention can also be applied to a case in which the street 1 on which the vehicle 9 travels is a general road, the length in the front-rear direction of the white line portion of the lane boundary line 4 is 6 m (or 5 m), and the length in the front-rear direction of the blank portion 4B is 9 m (or 5 m). In this case, the first reference value k, and the third reference value n, and the like will be changed according to the length in the front-rear direction of the white line portion of the lane boundary line and the length in the front-rear direction of the blank portion.

In the above embodiment, a case where the traveling lane recognition apparatus 11 is applied to a four-wheeled vehicle is taken as an example, but the type of vehicle to which the traveling lane recognition apparatus of the present invention is applied is not limited.

The above embodiment has been described on an assumption of a rule that the vehicle travels on the left side of the street as in Japan, but the present invention can also be applied to a case where the vehicle travels on the right side of the street as in US.

In the above embodiment, the lane line detection processing shown in FIG. 3 is a specific example of the "lane line detection step" in the description of the claims and the traveling lane recognition processing shown in FIG. 8 is a specific example of the "traveling lane recognition step" in the claims.

The present invention can be modified as appropriate without departing from the scope or spirit of the invention which can be read from the claims and the entire specification, and the traveling lane recognition apparatus, the traveling lane recognition method and the program with such a change are also included in the technical concept of the present invention.

According to the present invention, the lane in which the vehicle is traveling can be recognized with high accuracy based on the image of the street captured by the camera.

What is claimed is:

1. A traveling lane recognition apparatus, comprising:
    a camera configured to continuously capture a front area, a rear area, or left and right areas of a vehicle traveling on a street; and a controller, wherein
the controller is configured to perform:
- a lane line detection to detect a lane line on the street using a plurality of continuously captured images obtained by imaging continuous capturing of the camera; and
- a traveling lane recognition to recognize a lane in which the vehicle is traveling among a plurality of lanes on the street based on the lane line detected by the lane line detection, wherein, in the lane line detection, the controller is configured:
- to extract an image in a predetermined range from each of the plurality of captured images as a detection target image;
- to recognize a linear marking position where a linear marking exists in each of the detection target images;
- to repeatedly perform image detection processing for detecting a white line or a blank at the linear marking position in each of the plurality of detection target images corresponding to the plurality of captured images, in an order of capturing time points of the plurality of captured images;
- as a result of the image detection processing, to determine that the linear marking existing at the linear marking position is a solid lane line when a white line is detected at the linear marking position continuously for a first reference number of times or more in the plurality of detection target images, the first reference number of times is a natural number of 2 or more; and
- as a result of the image detection processing, to determine that the linear marking existing at the linear marking position is a broken lane line when, at the linear marking position in the plurality of detection target images, continuous detection of a white line with a second reference number of times or more and less than the first reference number of times and continuous detection of a blank with a third reference number of times or more is repeated alternately a plurality of times, the second reference number of times and the third reference number of times are a natural number respectively, and wherein, in the traveling lane recognition, the controller is configured to recognize the lane in which the vehicle is traveling among the plurality of lanes on the street based on a positional relationship between the solid lane line detected by the lane line detection and the vehicle and a positional relationship between the broken lane line detected by the lane line detection and the vehicle.

2. The traveling lane recognition apparatus according to claim 1, wherein
in the lane line detection, the controller is configured to extract, as the detection target image, an image in a range in which a length in a front-rear direction is shorter than a length in the front-rear direction of a blank portion of a lane boundary line marked on the street, and a length in a left-right direction is three or more times a width of one lane of the street, from each captured image.

3. The traveling lane recognition apparatus according to claim 2, wherein
in the lane line detection, the controller is configured to calculate, when it is assumed that an ideal lane boundary line is captured by the camera while the vehicle is traveling, the number of times that the detection target image in which a white line portion in the ideal lane boundary line is not included is continuously obtained, based on a length in the front-rear direction of a blank portion of the ideal lane boundary line, a length in the front-rear direction of the detection target image, a traveling speed of the vehicle, and a capturing speed of the camera, and set this number of times as the third reference number of times.

4. The traveling lane recognition apparatus according to claim 1, wherein
in the lane line detection, the controller is configured to extract, as the detection target image, an image in a range in which a length in a front-rear direction is shorter than a length in the front-rear direction of a white line portion of a lane boundary line marked on the street, and a length in a left-right direction is three or more times a width of one lane of the street, from each captured image.

5. The traveling lane recognition apparatus according to claim 4, wherein
in the lane line detection, the controller is configured to calculate, when it is assumed that an ideal lane boundary line is captured by the camera while the vehicle is traveling, the number of times that the detection target image in which a blank portion in the ideal lane boundary line is not included is continuously obtained, based on a length in the front-rear direction of a white line portion of the ideal lane boundary line, a length in the front-rear direction of the detection target image, a traveling speed of the vehicle, and a capturing speed of the camera, and set this number of times as the second reference number of times.

6. The traveling lane recognition apparatus according to claim 4, wherein
in the lane line detection, the controller is configured to calculate, when it is assumed that an ideal lane boundary line is captured by the camera while the vehicle is traveling, the number of times that the detection target image in which a blank portion in the ideal lane boundary line is not included is continuously obtained, based on a length in the front-rear direction of a white line portion of the ideal lane boundary line, a length in the front-rear direction of the detection target image, a traveling speed of the vehicle, and a capturing speed of the camera, and set a number of times larger than this number of times as the first reference number of times.

7. The traveling lane recognition apparatus according to claim 1, wherein
when a "t"-th lane line from the vehicle to the left of the vehicle is a solid lane line, the controller is configured to recognize that the lane in which the vehicle is traveling among the plurality of lanes of the street is a "t"-th lane from a left end on one side of the street, and the "t" is a natural number.

8. The traveling lane recognition apparatus according to claim 1, wherein
when a "t"-th lane line from the vehicle to the right of the vehicle is a solid lane line, the controller is configured to recognize that the lane in which the vehicle is traveling among the plurality of lanes of the street is a "t"-th lane from a right end on one side of the street, and the "t" is a natural number.

9. A traveling lane recognition method, comprising:
a lane line detection of detecting a lane line of a street using a plurality of continuously captured images obtained by a camera continuously capturing a front area, a rear area, or left and right areas of a vehicle traveling on the street, and a traveling lane recognition of recognizing a lane in which the vehicle is traveling among a plurality of lanes on the street based on the lane line detected in the lane line detection, wherein in the lane line detection, an image in a predetermined range is extracted from each of the plurality of captured images as a detection target image, a linear marking position where a linear marking exists is recognized in each of the detection target images, image detection processing for detecting a white line or a blank at the linear marking position in each of the plurality of detection target images corresponding to the plurality of captured images is repeatedly performed in the order of capturing time points of the plurality of captured images, as a result of the image detection processing, it is determined that the linear marking existing at the linear marking position is a solid lane line when a white line is detected at the linear marking position continuously for a first reference number of times or more in the plurality of detection target images, the first reference number of times is a natural number of 2 or more, and as a result of the image detection processing, it is determined that the linear marking existing at the linear marking position is a broken lane line when, at the linear marking position in the plurality of detection target images, continuous detection of a white line with a second reference number of times or more and less than the first reference number of times k and continuous detection of a blank with a third reference number of times or more is repeated alternately a plurality of times, the first reference number of times is a natural number of 2 or more, in the traveling lane recognition, the lane in which the vehicle is traveling among the plurality of lanes on the street is recognized based on a positional relationship between the solid lane line detected in the lane line detection step and the vehicle and a positional relationship between the broken lane line detected in the lane line detection and the vehicle.

10. A non-transitory computer readable medium storing a program causing a computer to execute the traveling lane recognition method according to claim 9.

\* \* \* \* \*